(12) United States Patent
Bonny

(10) Patent No.: US 11,376,953 B1
(45) Date of Patent: Jul. 5, 2022

(54) PIVOTABLE DRIVE APPARATUS FOR A STAND-ON VEHICLE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 25 days.

(21) Appl. No.: 17/113,439

(22) Filed: Dec. 7, 2020

Related U.S. Application Data

(63) Continuation of application No. 15/723,807, filed on Oct. 3, 2017, now Pat. No. 10,857,879.

(60) Provisional application No. 62/422,336, filed on Nov. 15, 2016, provisional application No. 62/415,177, filed on Oct. 31, 2016, provisional application No. 62/403,498, filed on Oct. 3, 2016.

(51) Int. Cl.
| | |
|---|---|
| *F16H 47/02* | (2006.01) |
| *F16H 39/14* | (2006.01) |
| *B60K 17/10* | (2006.01) |
| *B60K 17/04* | (2006.01) |
| *B62D 11/12* | (2006.01) |

(52) U.S. Cl.
CPC ............ *B60K 17/10* (2013.01); *B60K 17/043* (2013.01); *B62D 11/12* (2013.01); *F16H 39/14* (2013.01); *F16H 47/02* (2013.01)

(58) Field of Classification Search
CPC ....... B60K 17/10; B60K 17/043; F16H 39/14; F16H 47/02

USPC ............................................. 74/731.1, 606 R
See application file for complete search history.

(56) References Cited

U.S. PATENT DOCUMENTS

| | | | | |
|---|---|---|---|---|
| 5,078,222 A | * | 1/1992 | Hauser ................... | B62D 11/18 180/6.48 |
| 5,918,691 A | * | 7/1999 | Ishii ...................... | B60K 17/105 180/19.1 |
| 6,125,630 A | | 10/2000 | Abend et al. | |
| 6,843,056 B1 | * | 1/2005 | Langenfeld ............. | F04B 1/324 60/485 |
| 8,393,236 B1 | * | 3/2013 | Hauser ................... | B60T 1/062 74/15.86 |
| 9,499,199 B1 | | 11/2016 | Laymon et al. | |
| 9,969,258 B1 | | 4/2018 | Hauser | |
| 2005/0266951 A1 | | 12/2005 | Han | |
| 2009/0065273 A1 | * | 3/2009 | Wyatt ............... | B60W 30/1886 180/65.8 |

(Continued)

*Primary Examiner* — Ha Dinh Ho
(74) *Attorney, Agent, or Firm* — Neal, Gerber & Eisenberg LLP

(57) ABSTRACT

A vehicle transmission housing has first and second axle housings pivotably connected to opposite ends of the transmission housing and a stand-on platform may be connected to the assembly. A first gear train in the first axle housing drives a first axle having a first axis of rotation. A second gear train is disposed in the second axle housing drives a second axle having a second axis of rotation collinear with the first axis of rotation. The axle housings are both capable of pivoting about the transmission housing about a third axis that is parallel to the first and second axes. The first and second axle housings may also be separately rigidly or flexibly connected to one another. This assembly permits adjustment of the ground heights of the platform with respect to a vehicle frame.

11 Claims, 14 Drawing Sheets

(56) References Cited

U.S. PATENT DOCUMENTS

2010/0126792 A1 5/2010 Kallevig
2014/0059989 A1 3/2014 Ishii et al.

* cited by examiner

PIVOTABLE DRIVE APPARATUS FOR A STAND-ON VEHICLE

CROSS-REFERENCE

This application is a continuation of U.S. patent application Ser. No. 15/723,807, filed on Oct. 3, 2017, which claims the benefit of U.S. Provisional Application No. 62/422,336, filed on Nov. 15, 2016, U.S. Provisional Application No. 62/415,177, filed on Oct. 31, 2016, and U.S. Provisional Application No. 62/403,498, filed on Oct. 3, 2016. The contents of these prior applications are incorporated herein by reference in their entirety.

BACKGROUND

The disclosure herein relates to a compact drive apparatus used in connection with a stand-on vehicle.

SUMMARY

Stand-on utility vehicles such as lawn mowers are known, and generally have a prime mover such as an internal combustion engine mounted on a frame and engaged to and driving a transmission, which may be a hydrostatic transmission. Stand-on vehicle designs are shown in commonly-owned U.S. Pat. No. 9,499,199 and commonly-owned U.S. patent application Ser. No. 14/692,970, now U.S. Pat. No. 9,969,258; the disclosures of both of these references are incorporated herein by reference. It is also known to attach the stand-on platform to the frame of the vehicle in such a manner that the platform can be adjusted to different heights.

The pivotable drive apparatuses disclosed herein provide for attachment of the stand-on platform to one or more components of the drive apparatus. The drive apparatuses include a hydrostatic transmission and a pair of axle assemblies that provides not only a compact design but also simplifies the installation of the drive, the axles, and the stand-on platform components in the vehicle and allows the user to adjust the ground height of both the vehicle frame and the stand-on platform simultaneously or alternatively, to adjust the ground height of the vehicle frame while maintaining the height of the stand-on platform.

A better understanding of the disclosure will be obtained from the following detailed descriptions and accompanying drawings, which set forth illustrative embodiments indicative of the various ways in which the principals of the invention may be employed.

DETAILED DESCRIPTION OF THE DRAWINGS

Figure 1:
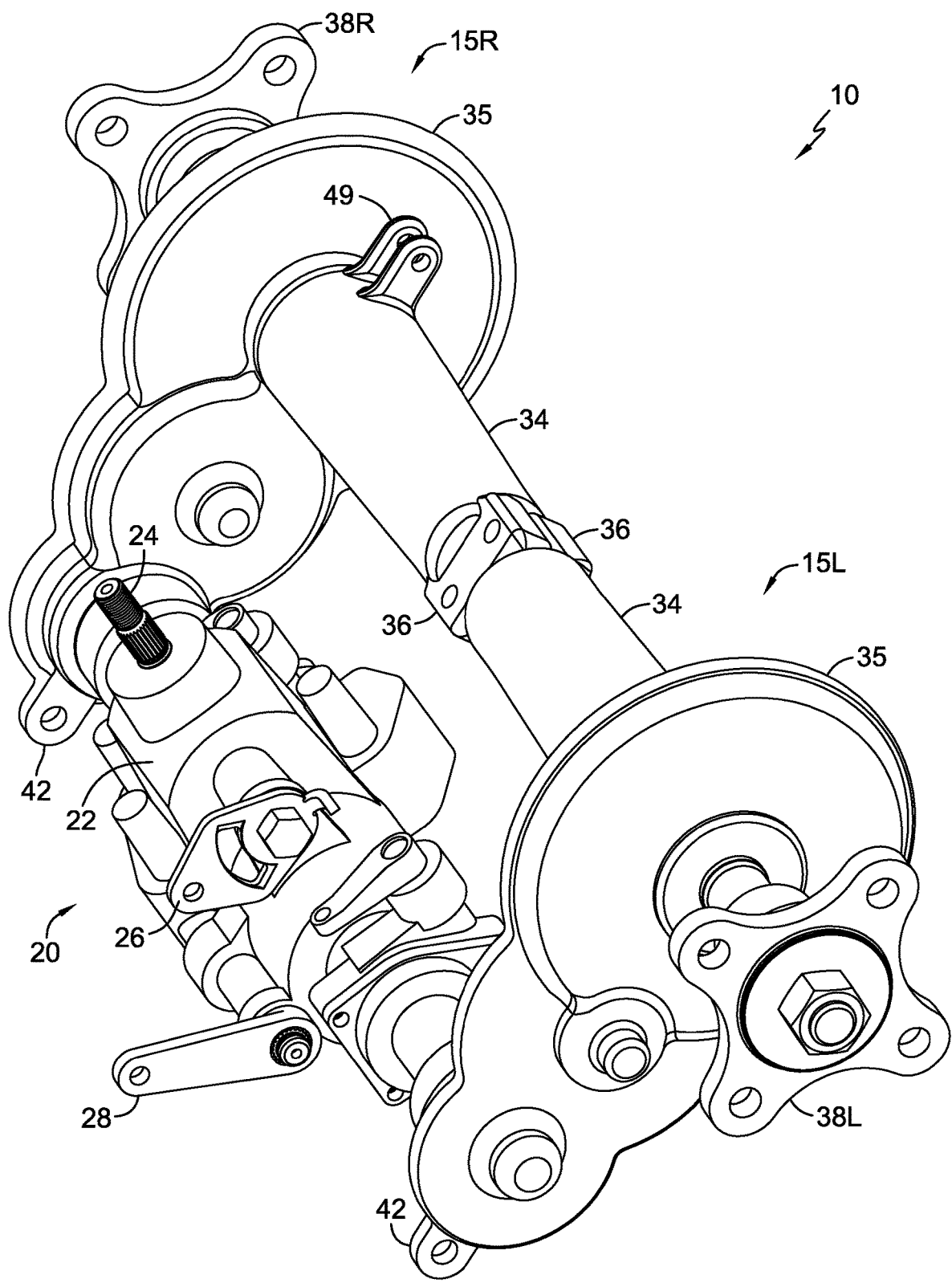
FIG. 1 is an external perspective view of a drive apparatus in accordance with the teachings herein.
Figure 2:
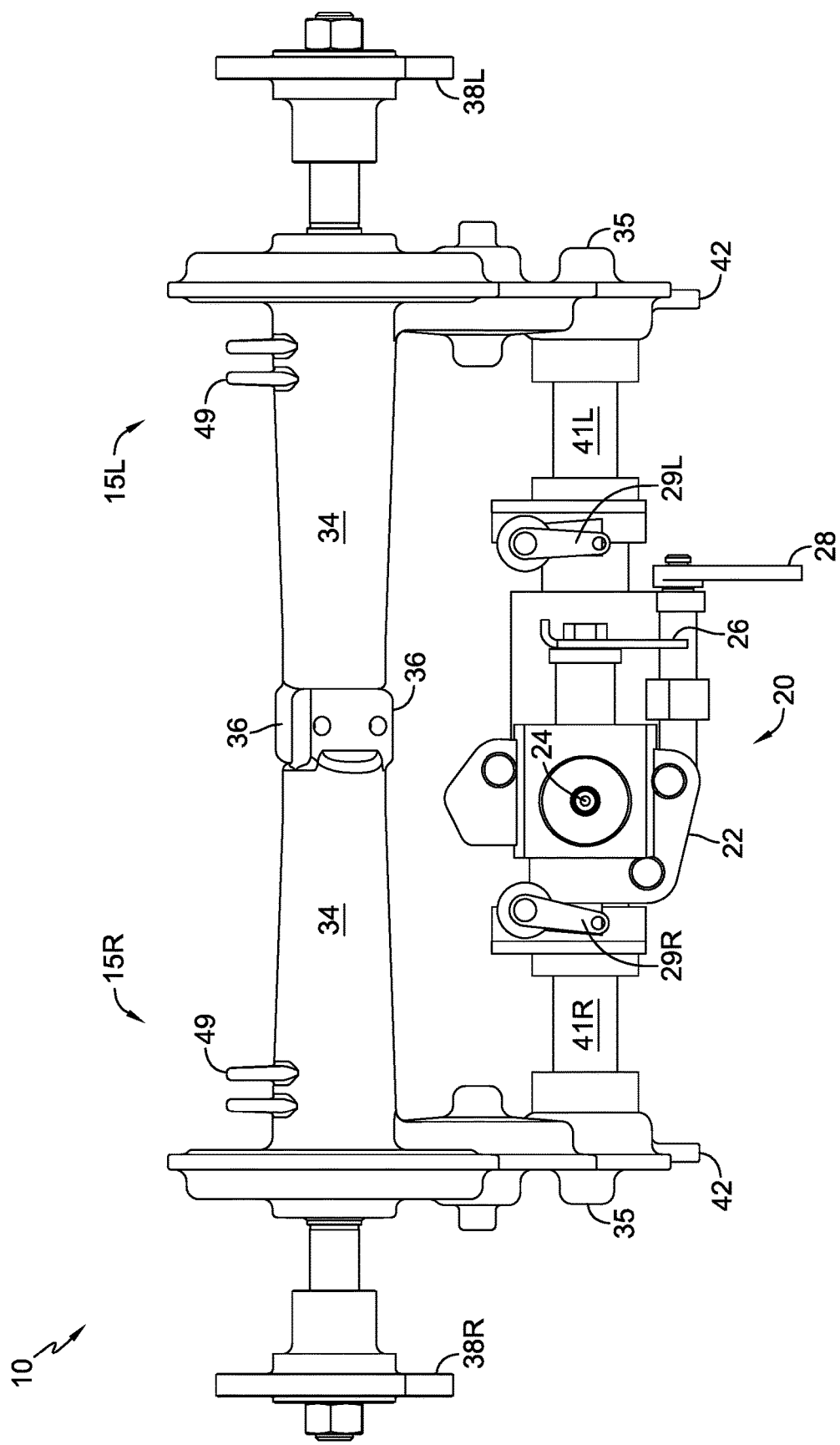
FIG. 2 is a top plan view of the drive apparatus of FIG. 1.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers using different prefixes in cases where such labeling facilitates a more clear description or understanding. Additionally, the drawings set forth herein are not necessarily drawn to scale, and in some instances proportions may have been exaggerated to more clearly depict certain features. Item number suffixes "L" and "R" used herein relate to typical "Left" and "Right" orientation of certain components and assemblies as viewed from the rear of a typical stand-on vehicle, and are not limiting as to the scope of the invention. This specification is intended to be taken as a whole and interpreted in accordance with the principles of the invention as taught herein and understood by one of ordinary skill in the art.

A first embodiment of a pivotable drive apparatus 10 is shown in FIGS. 1-4, where drive apparatus 10 comprises a hydrostatic transmission assembly 20 having a transmission housing 22, and a pair of preferably identical final reduction axle assemblies 15L, 15R, each comprising a drive axle 32 disposed in an axle housing 34. Each axle housing 34 includes an engagement structure 36. When assembled in drive apparatus 10, the two engagement structures 36 are located at the proximal ends of the two axle housings 34 adjacent to the center of drive apparatus 10 and are illustrated as tab-like structures capable of being connected together by means of fasteners (not shown). Each axle assembly 15L, 15R also includes a gear housing 35 formed with or connected to the distal end of each axle housing 34.

Each gear housing 35 houses one of a pair of reduction gear trains 45L, 45R as discussed herein.

Figure 14:
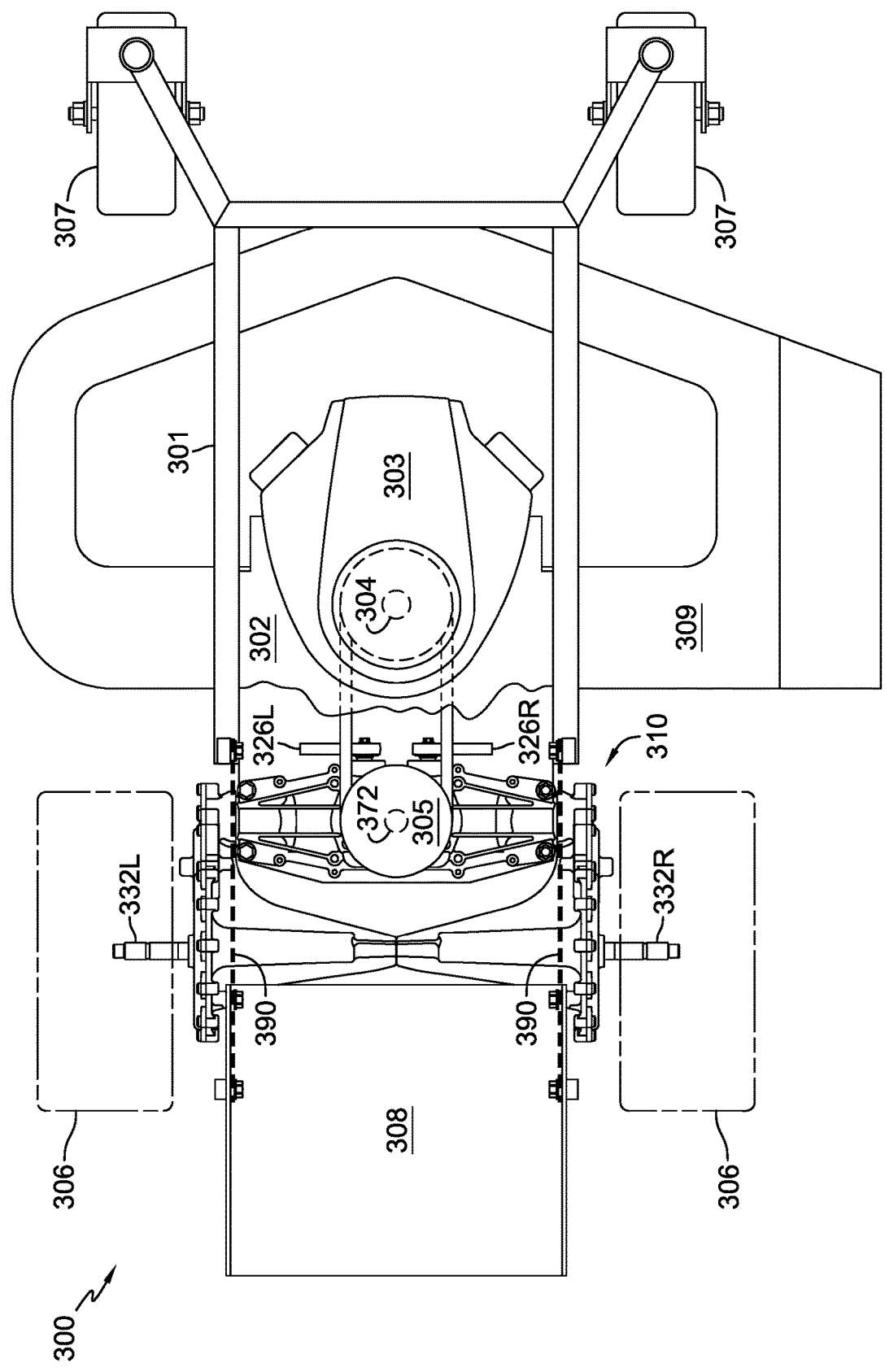
FIG. 14 is a plan view of an exemplary vehicle incorporating one of the drive apparatuses disclosed herein.

A pair of output drive shaft housings 41L, 41R is disposed, one to either side of transmission housing 22, adjacent to gear housings 35. The various housings cooperate to form the drive apparatus 10 to be mounted into a vehicle such as vehicle 300 having a stand-on platform 308. It will be understood that vehicle 300 of FIG. 14 depicts an embodiment of the drive apparatus disclosed herein, and in particular drive apparatus 310 shown in FIGS. 7-10, as described in more detail below, but the applicability and use of drive apparatus 10 or the other drive apparatuses described herein in a similar vehicle will be known to one of ordinary skill in the art. Various thrust bearings, shaft bearings, fasteners, pistons and the like are depicted in the figures but not described herein as these will be understood by one of ordinary skill in the art.

Figure 3:
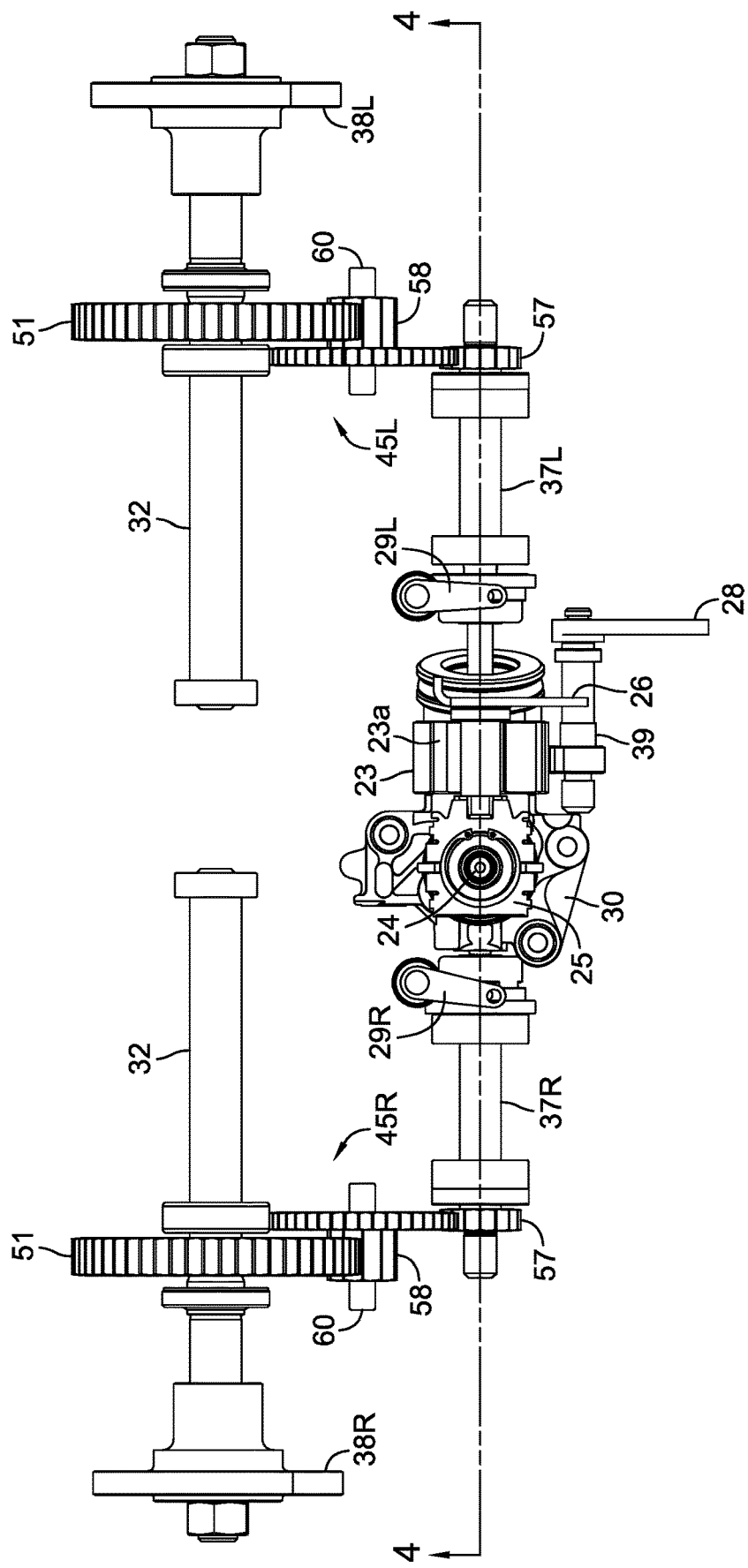
FIG. 3 is a top plan view of the drive apparatus of FIG. 1, with housing elements removed.
Figure 4:
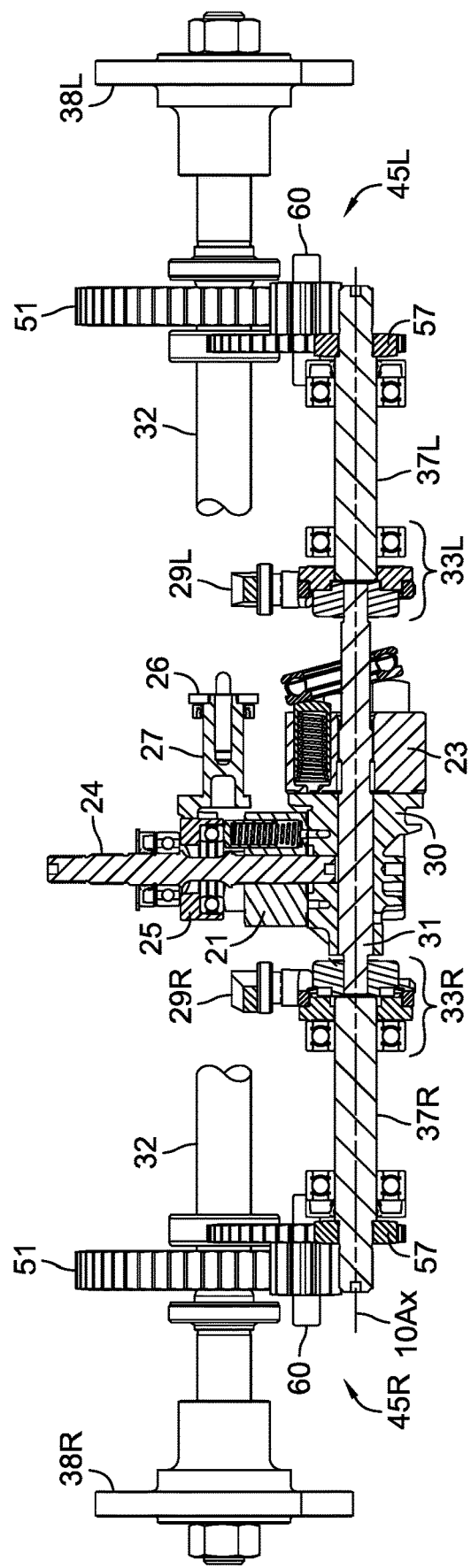
FIG. 4 is a cross-sectional view through the pivot axis of the hydrostatic transmission of the drive apparatus shown in FIG. 3, along the line 4-4.

As shown most clearly in FIGS. 3 and 4, hydrostatic transmission assembly 20 comprises a pump cylinder block 21 and a motor cylinder block 23 both rotatably disposed on center section 30. Center section 30 includes hydraulic porting therein (not shown) to hydraulically connect pump cylinder block 21 to motor cylinder block 23. Pump input shaft 24 is engaged to and drives the pump cylinder block 21, and extends out of transmission housing 22 where it is driven by a pulley powered by a prime mover in a known manner, such as pulley and belt assembly 305, prime mover 303 and prime mover output shaft 304 as shown in FIG. 14. External control arm 26 is engaged to a trunnion arm 27 for pivoting of a swash plate 25, thereby controlling the output of pump cylinder block 21. Motor cylinder block 23 is formed with a series of slots 23a arranged about its circumference, and a brake mechanism 39 may be engaged to the slots 23a by brake arm 28, to provide a parking brake.

Motor output shaft 31 is engaged to and driven by motor cylinder block 23, and extends out both sides of center section 30 to drive the pair of reduction gear trains 45L, 45R. A pair of clutch assemblies 33L, 33R is provided, one on each end of motor output shaft 31, to permit the operator to clutch one side of drive apparatus 10 or the other, or to apply a braking force to one side of drive apparatus 10 or the other, to enable steering of the stand-on vehicle. Each of the clutch assemblies 33L, 33R connects an end of motor output shaft 31 to a respective output drive shaft 37L, 37R, and each output drive shaft 37L, 37R is engaged to a respective gear train 45L, 45R. A pair of operator levers 29L, 29R is engaged to the pair of clutch assemblies 33L, 33R, to permit the operator to engage each clutch assembly 33L, 33R independently or together, using appropriate linkages (not shown).

Each of the pair of reduction gear trains 45L, 45R terminates in a main gear 51 which drives a respective hub 38L, 38R for attachment of a vehicle wheel such as driven wheel 306 of FIG. 14, and further comprises a pinion gear 57 disposed on the end of an output drive shaft 37L or 37R, and a combination reduction gear 58 mounted on a jack shaft 60.

The output drive shafts 37L, 37R are illustrated herein as being of equal length. A vehicle manufacturer may instead select different lengths for these components (and associated output drive shaft housings 41L, 41R) in order to shift the location of pump input shaft 24 toward one side of a vehicle or the other to achieve a desired drive belt routing, linkage configuration, etc.

A benefit of having the two axle assemblies 15L, 15R separable, and yet capable of being joined by means of the pair of engagement structures 36, is that it allows the vehicle manufacturer to manipulate the two sides of drive apparatus 10 separately for ease of installation, and then to connect the two axle assemblies 15L, 15R together when placed in the vehicle, to provide improved rigidity and axle alignment. Each axle housing 34 includes an attachment structure 49 for attachment of a vehicle's stand-on platform directly to the drive apparatus 10. A simple modification of stand-on platform 308 shown in FIG. 14 will accommodate attachment of platform 308 to attachment structures 49. A simple offset bar (not shown) or other extension component can be added between the pair of engagement structures 36 to increase the overall width of drive apparatus 10 for versatile use in more than one vehicle model. A corresponding adjustment in length of one or both of the output drive shafts 37L, 37R and associated output drive shaft housings 41L, 41R is needed if the overall width of drive apparatus 10 is adjusted. The drive apparatus 10 is mounted in the vehicle so as to be pivotable about the axis 10Ax of the motor output shaft 31 so that the ground clearance of the vehicle frame may be varied in relation to the axle assemblies 15L, 15R, thus also adjusting the position of the stand-on platform in relation to the frame of the vehicle. That is, the prime mover and the transmission assembly 20 are mounted to the vehicle frame in a fixed relationship to one another, while the axle assemblies 15L, 15R can be pivoted about the axis 10Ax of the motor output shaft 31 of transmission assembly 20. When the axle assemblies 15L, 15R are pivoted in this manner, this effectively raises or lowers the vehicle frame in relation to the ground, and a corresponding height adjustment may be needed at the front wheels to maintain an approximately level vehicle frame, mowing deck, etc. A pair of attachment ears 42 is provided to enable the user to lock drive apparatus 10 into a chosen position once the appropriate adjustments are made.

Figure 5:
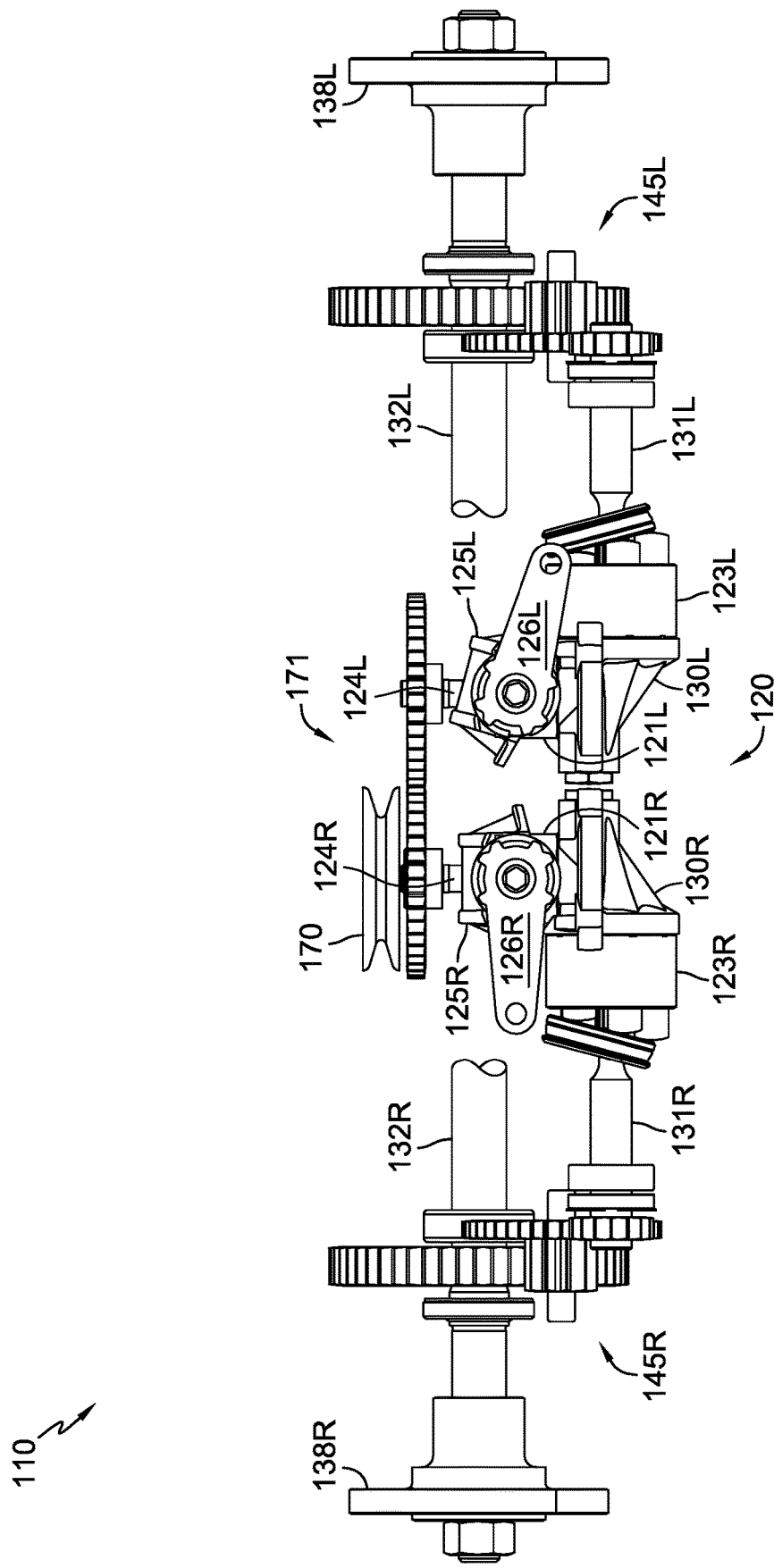
FIG. 5 is a front, elevational internal view of a second embodiment of a transmission for use in connection with a drive apparatus in accordance with the teachings herein.
Figure 6:
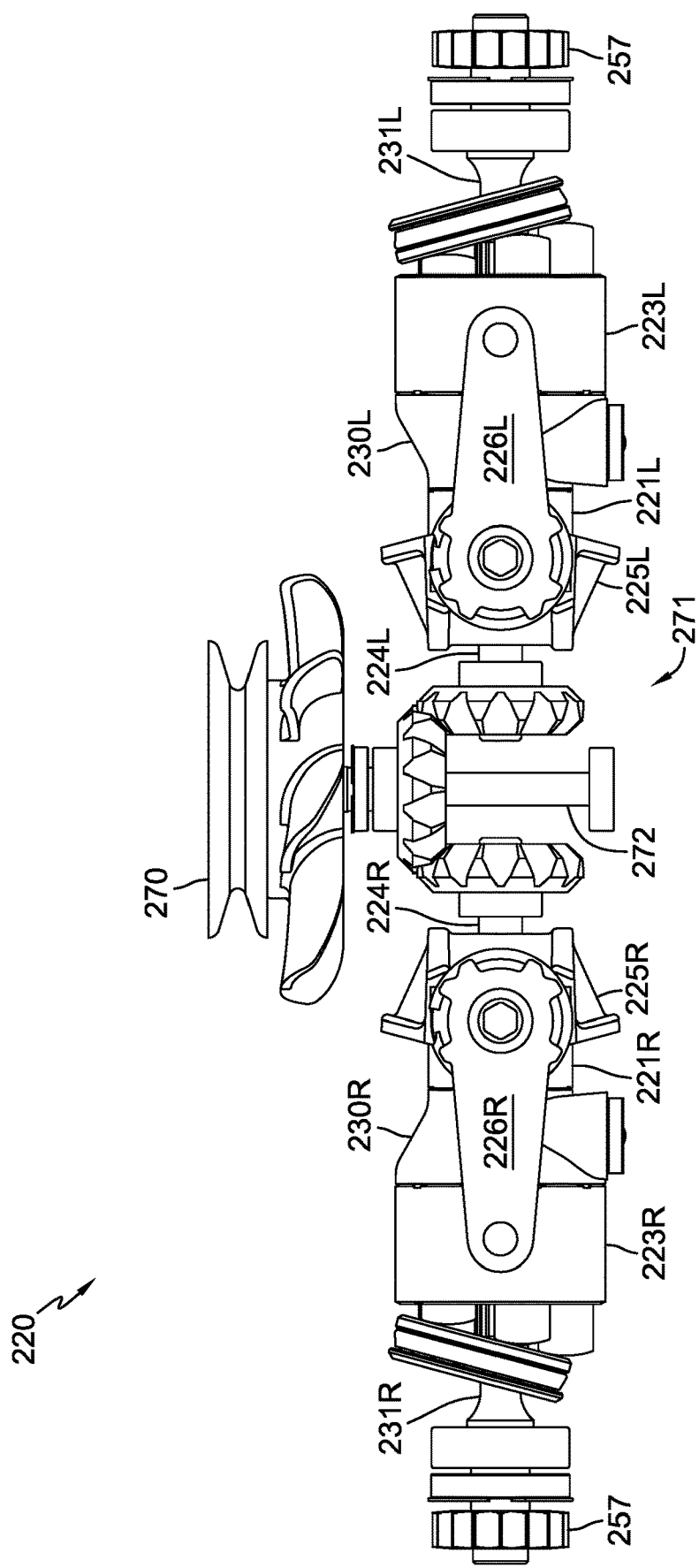
FIG. 6 is a front, elevational internal view of a third embodiment of a transmission for use in connection with a drive apparatus in accordance with the teachings herein.
Figure 7:
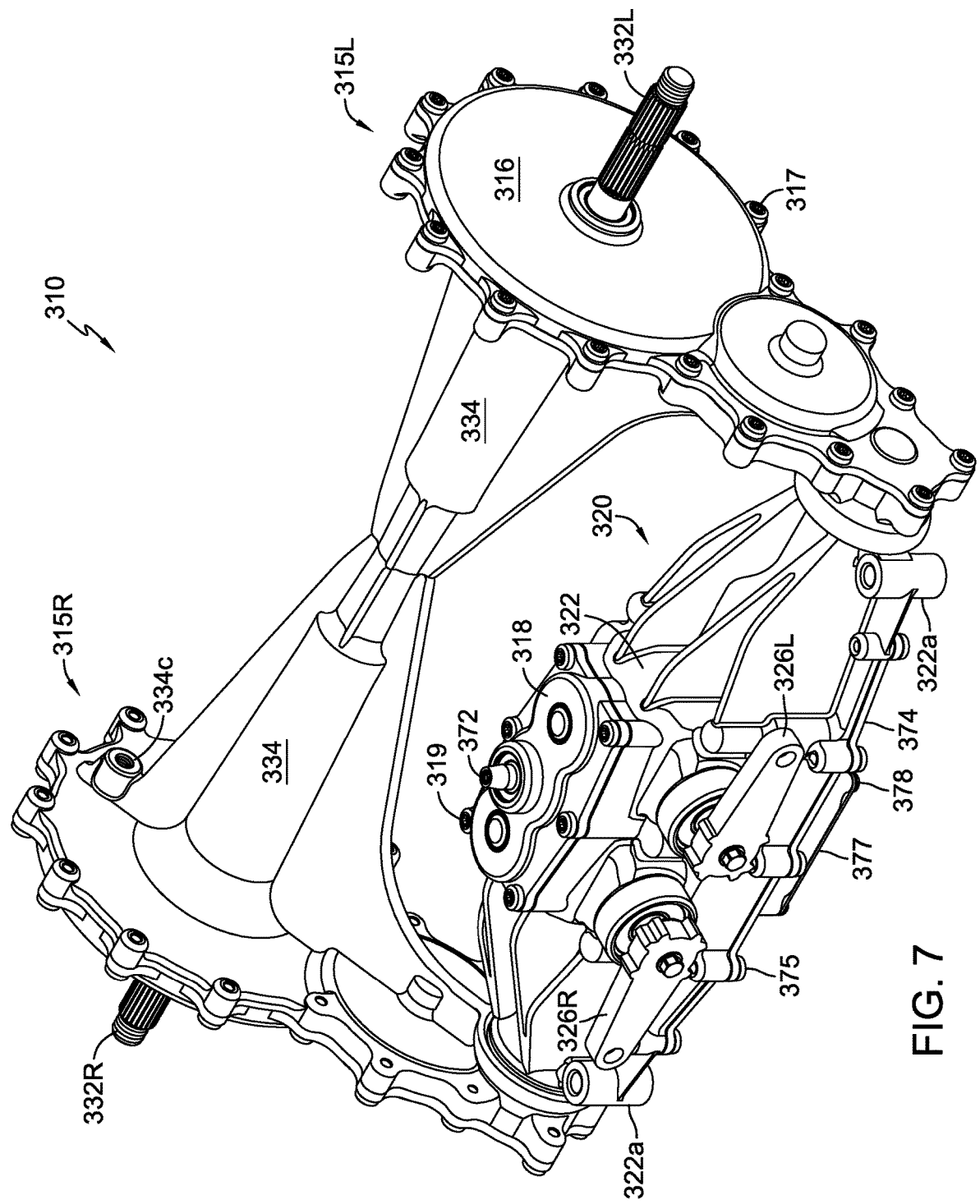
FIG. 7 is a perspective view of a further embodiment of a drive apparatus in accordance with the teachings herein.

Alternative embodiments are depicted in FIGS. 5 and 6, and the transmissions disclosed therein may be used with the drive apparatus disclosed herein, and in particular may be used in housings similar to the housing structures discussed above. Structures that are similar to prior structures in appearance and/or function to those previously described are assigned a similar numeral but with a different prefix. Not every such structure is discussed in detail where the operation or construction thereof would be understood by a person of skill in the art. The housings for the embodiments depicted in FIGS. 5 and 6 are not shown in order to clearly depict the internal structures of the transmissions at issue; it will be understood that these housings would be essentially the same as those depicted in FIGS. 1-4, with certain modifications that would be known to one of ordinary skill in the art.

More specifically, a second embodiment of a drive apparatus 110 comprising hydrostatic transmission 120 is shown in FIG. 5, where two separate center sections 130L, 130R are used to mount a pair of pump cylinder blocks 121L, 121R. The output of each pump cylinder block 121L, 121R is controlled by a respective swash plate 125L, 125R, using respective control arms 126L, 126R. A single input pulley 170 is engaged to one or the other of pump input shafts 124L, 124R to drive the pair of pump cylinder blocks 121L, 121R by means of an input gear set 171.

A pair of motor cylinder blocks 123L, 123R is also disposed on respective center sections 130L, 130R and connected to pump cylinder blocks 121L, 121R through hydraulic porting (not shown) in center sections 130L, 130R. Each motor cylinder block 123L, 123R drives a motor output shaft 131L, 131R to drive a reduction gear train 145L, 145R and respective output axles 132L, 132R and hubs 138L, 138R in a manner similar to that described above.

A third embodiment of a hydrostatic transmission 220, also suitable for use in a pivotable drive apparatus, is shown in FIG. 6, where two separate center sections 230L, 230R are used to mount a pair of pump cylinder blocks 221L, 221R. The output of each pump cylinder block 221L, 221R is controlled by a respective swash plate 225L, 225R, using control arms 226L, 226R. A pulley 270 is used to drive the pair of pump cylinder blocks. A difference from the prior embodiment is that the pumps and motors in the third embodiment are disposed in a back-to-back relationship, and pulley 270 drives an input shaft 272 of a T-box style gear set 271 to power the two pump input shafts 224L, 224R.

A pair of motor cylinder blocks 223L, 223R is also disposed on respective center sections 230L, 230R and connected to pump cylinder blocks 221L, 221R through hydraulic porting (not shown) in center sections 230L, 230R. Each motor cylinder block 223L, 223R drives a motor output shaft 231L, 231R, each having a pinion gear 257 disposed on the distal end thereof.

A further embodiment of a drive apparatus 310 having a transmission assembly 320 connected to a pair of final reduction axle assemblies 315L, 315R is shown in FIGS. 7-10. Referenced previously herein, FIG. 14 depicts the drive apparatus 310 in vehicle 300 having a frame 301 supporting a pair of casters 307, and a prime mover 303 mounted on vehicle platform 302. A prime mover output shaft 304 drives pulley and belt assembly 305 to power the transmission input shaft 372. Vehicle 300 is depicted as a stand-on lawn mower and includes a mowing deck 309. A pair of driven wheels 306 is engaged to the two output axles 332L, 332R, the speed and direction of which may be controlled by respective control arms 326L, 326R engaged to operator controls (not shown). Prime mover 303 may be, for example, an internal combustion engine of standard size and output for a vehicle such as stand-on mower 300.

A pair of axle housings comprising a pair of axle main housings (or gear train housings or combination gear train/axle housings) 334 is pinned together and the pair of axle main housings 334 is also connected to opposite ends of hydrostatic transmission assembly 320 in a pivotable manner by means of interface structures 322b formed on each end of transmission main housing 322. Interface structures 322b are joined by means of a slip fit connection to corresponding attachment openings 334b formed in each gear train housing 334, such that each gear train housing 334 can pivot about a common axis of hydrostatic transmission assembly 320, namely the axes of rotation of the two output shafts 331L, 331R described below. Such pivoting provides the benefits described above with regard to the positioning of the various components in vehicle 300. Retaining rings 364 are compressed radially by ramps 334d during assembly and, when the drive apparatus 310 is assembled, engage grooves 334e to prevent axial movement of final reduction axle assemblies 315L, 315R. Reduction gear train 345L (shown) and reduction gear train 345R (not shown) may be lubricated with grease and sealed at the slip fit interface by O-rings 365 mounted on the interface structures 322b.

Each gear train/axle housing 334 also includes a pin pocket 334a for receiving a joint pin 350, so that the gear train/axle housings 334 are engaged to one another in a manner that improves structural support and axial alignment of output axles 332L, 332R. Additionally, because the gear train housings 334 are engaged to one another in a somewhat flexible manner (i.e., able to flex about pin 350 and not locked together), ease of assembly is improved in this embodiment. This flexible engagement may also permit a limited degree of relative movement between components of drive apparatus 310 during operation of a vehicle such as vehicle 300 over rough terrain, during which flexing may occur.

Each gear train/axle housing 334 has an axle housing cover 316 connected thereto by fasteners 317. While only one is depicted, each gear train/axle housing 334 includes a connection structure, namely an attachment boss 334c to secure the stand-on platform 308 of vehicle 300. (The pair of final reduction axle assemblies 315L, 315R is preferably identical.) Drive apparatus 310 may be mounted on vehicle 300 by means of a plurality of mounting structures 322a formed on transmission main housing 322. A pair of adjustable and locking connection mechanisms 390 (represented by a pair of heavy dashed lines in FIG. 14) is provided to both facilitate a vehicle ground clearance adjustment to vehicle 300 and to secure the stand-on platform 308 in a level, fixed position relative to vehicle frame 301 once the ground clearance adjustment has been made.

Figure 9:
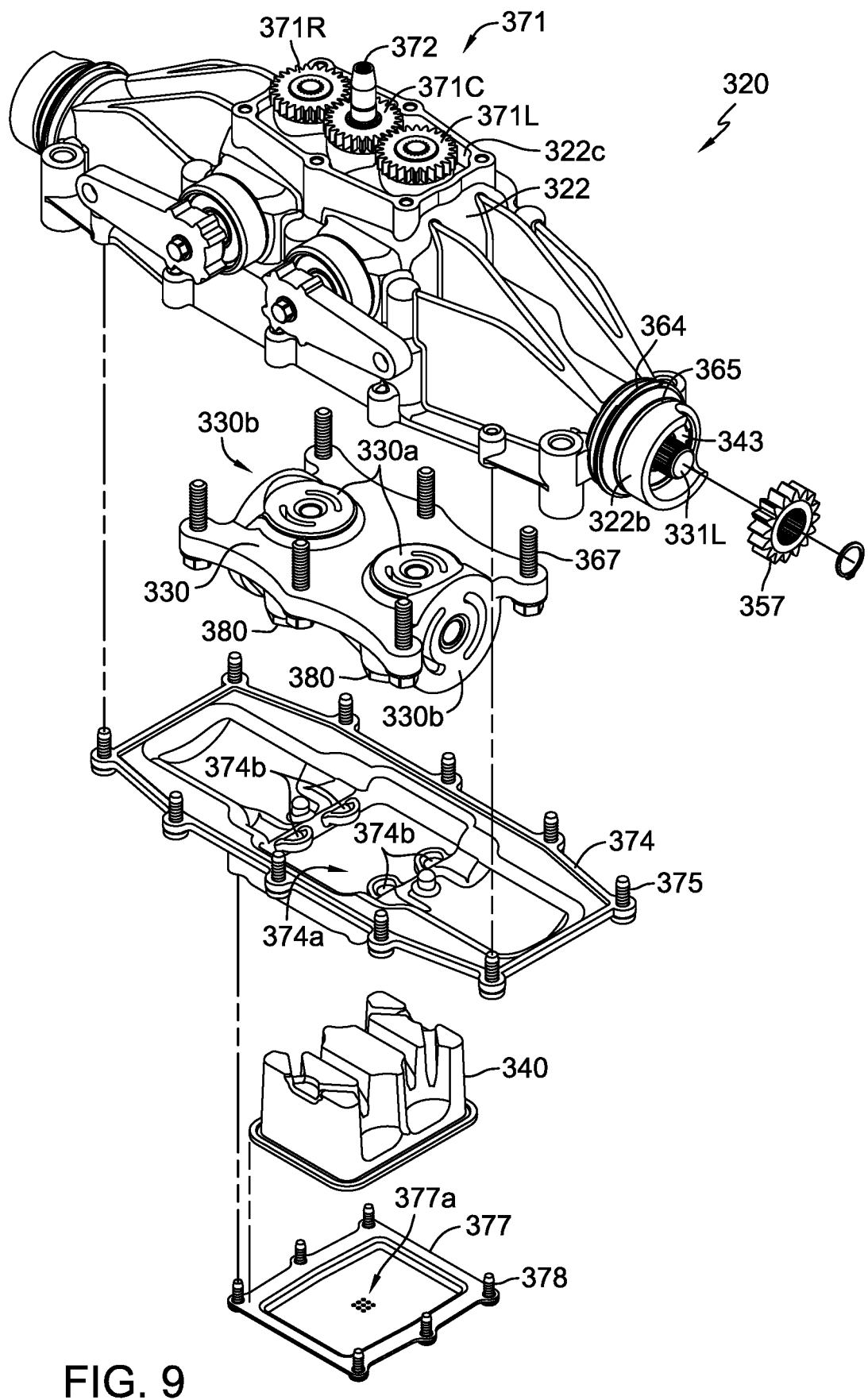
FIG. 9 is a partially exploded perspective view of the transmission housing and portions of the transmission of the drive apparatus of FIG. 7.

As shown in FIG. 9, a transmission cover 374 is secured to transmission main housing 322 by means of fasteners 375 to form an internal sump in transmission assembly 320. A bladder cover 377 is connected to transmission cover 374 by fasteners 378 to cover the bladder installation opening 374a and expansion bladder 340, and comprises an external air vent 377a. The optional expansion bladder 340 is inserted into opening 374a and is disposed in the internal sump and is trapped between bladder cover 377 and transmission cover 374. A set of deflectors 374b may be installed or formed integrally (as shown) on transmission cover 374 about the bladder installation opening 374a to protect expansion bladder 340 from pressurized fluid flow from bleeds (not shown) formed in the check plugs 380 described below. Hydraulic fluid is retained in the sump of transmission assembly 320 by means of joint sealant or gaskets and various seals, such as motor output shaft seals 343.

Figure 10:
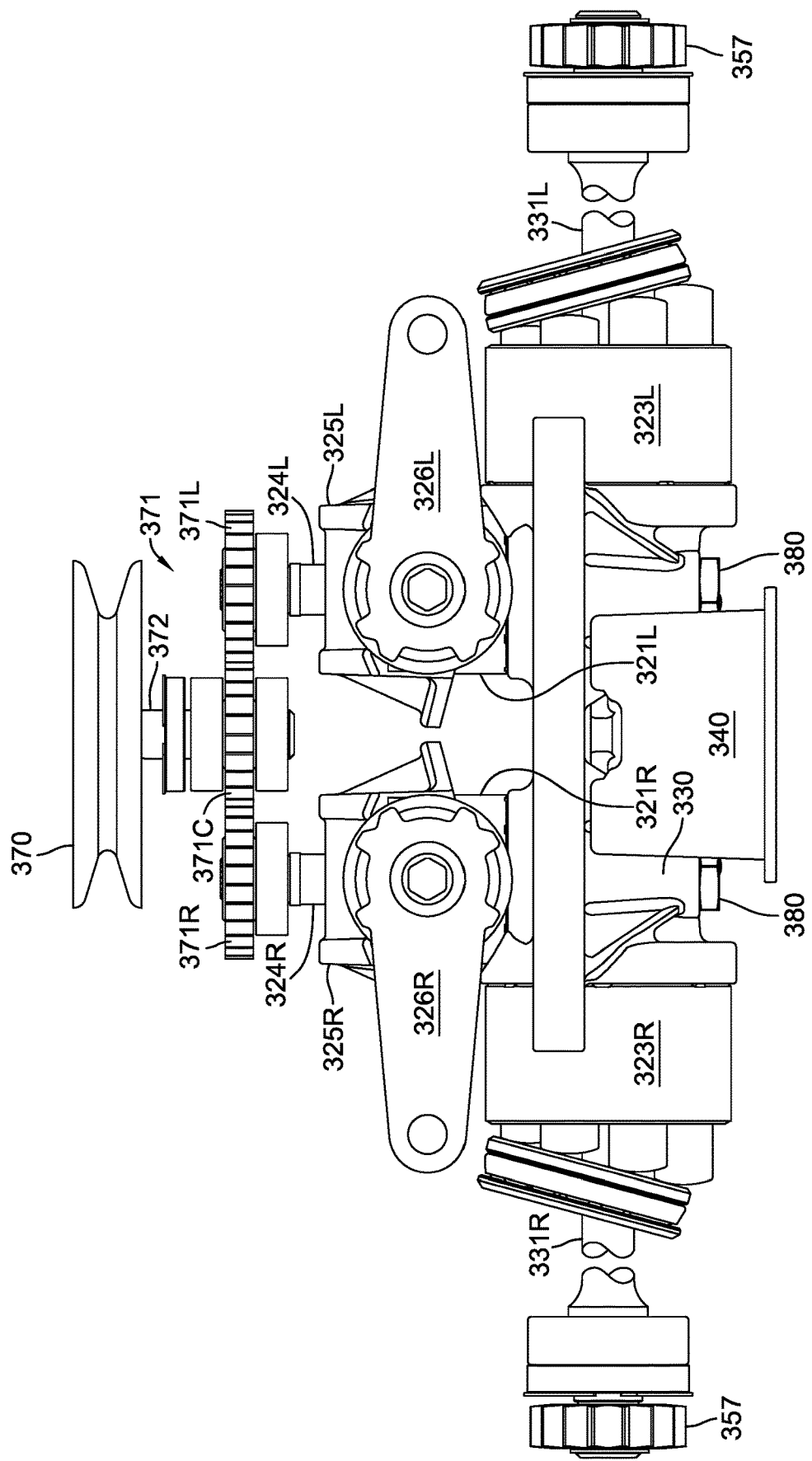
FIG. 10 is a front, elevational internal view of the transmission portion of the drive apparatus of FIG. 7.

Referring to FIGS. 9 and 10, a common center section 330 comprises a pair of pump running surfaces 330a on a top surface thereof, on which the two pump cylinder blocks 321L, 321R are rotatably disposed. Each pump running surface 330a is connected to a respective motor running surface 330b formed on opposite ends of center section 330, where the motor cylinder blocks 323L, 323R are rotatably disposed. As is known, a pair of kidney ports on each running surface permits hydraulic communication between the respective pump cylinder block and motor cylinder block through porting formed internal to center section 330. Two pairs of check plugs 380 are disposed on the bottom of center section 330 (one check plug 380 of each pair is shown) to permit hydraulic fluid to enter the porting of center section 330. Fasteners 367 are used to connect center section 330 to an internal surface (not shown) of transmission main housing 322.

Two pump input shafts 324L, 324R are driven by a pulley 370 and an input gear set 371, and two motor output shafts 331L, 331R are engaged to and driven by motor cylinder blocks 323L, 323R. Input gear set 371 is a balanced arrangement comprising three spur gears and having a separate input shaft 372 driving the central gear of the gear set.

As shown in FIG. 10, a pair of swash plates 325L, 325R is provided for controlling output of pump cylinder blocks 321L, 321R, respectively, and a pair of respective external control arms 326L, 326R is used to control the arcuate positioning of swash plates 325L, 325R, thereby controlling the output of pump cylinder blocks 321L, 321R.

Figure 8:
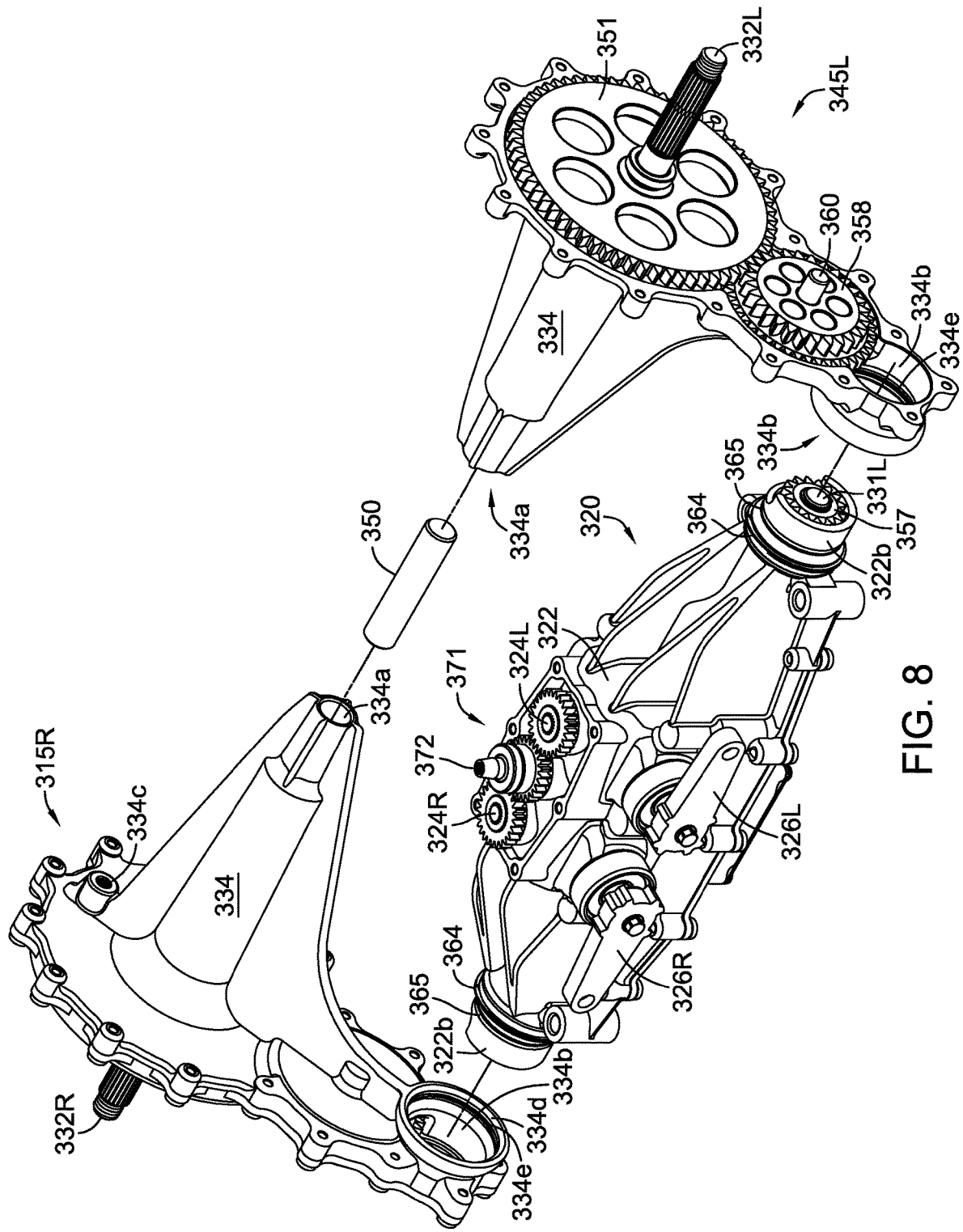
FIG. 8 is a partially exploded perspective view of the drive apparatus of FIG. 7 with certain components removed for clarity.

Each motor output shaft 331L, 331R drives an output pinion gear 357. As shown in FIG. 8 (with respect to transmission assembly 320 and final reduction axle assembly 315L), output pinion gear 357 is connected to motor output shaft 331L and drives the reduction gear 358 disposed on jack shaft 360. Reduction gear 358 then drives main gear 351 which is engaged to and drives the output axle 332L. The gear train on the opposite side with respect to final reduction axle assembly 315R and output axle 332R may be substantially identical thereto.

Input gear set 371 comprises three gears; namely, input gear 371C engaged to and driven by input shaft 372, right input gear 371R engaged to and driving pump input shaft 324R, and left input gear 371L engaged to and driving pump input shaft 324L. These three gears are disposed in a gear chamber 322c formed on an external, upper surface of transmission main housing 322 and are lubricated with hydraulic fluid from sump. Input gear cover 318 is secured to transmission main housing 322 by means of fasteners 319.

Figure 11:
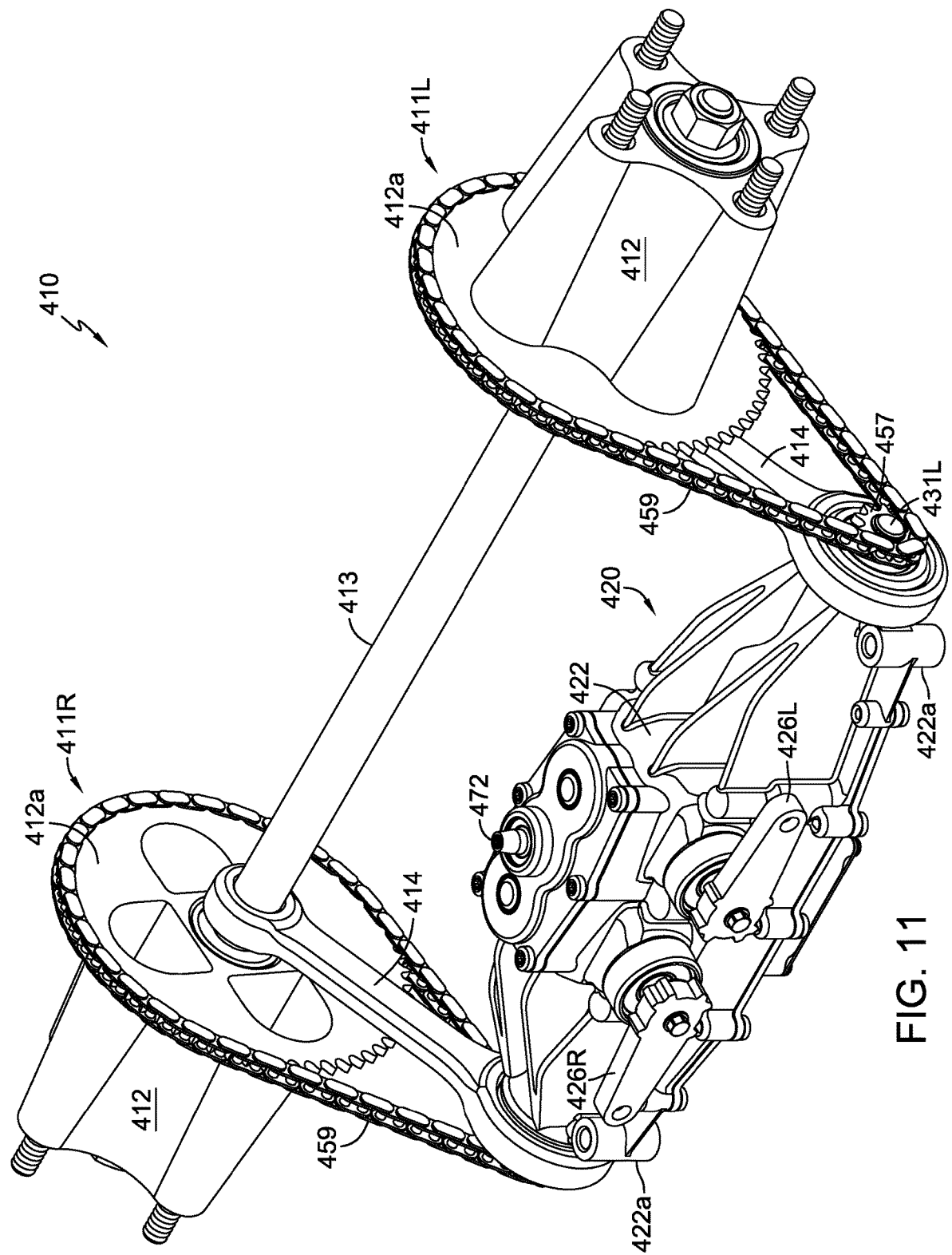
FIG. 11 is a front perspective view of another embodiment of a drive apparatus in accordance with the teachings herein.
Figure 12:
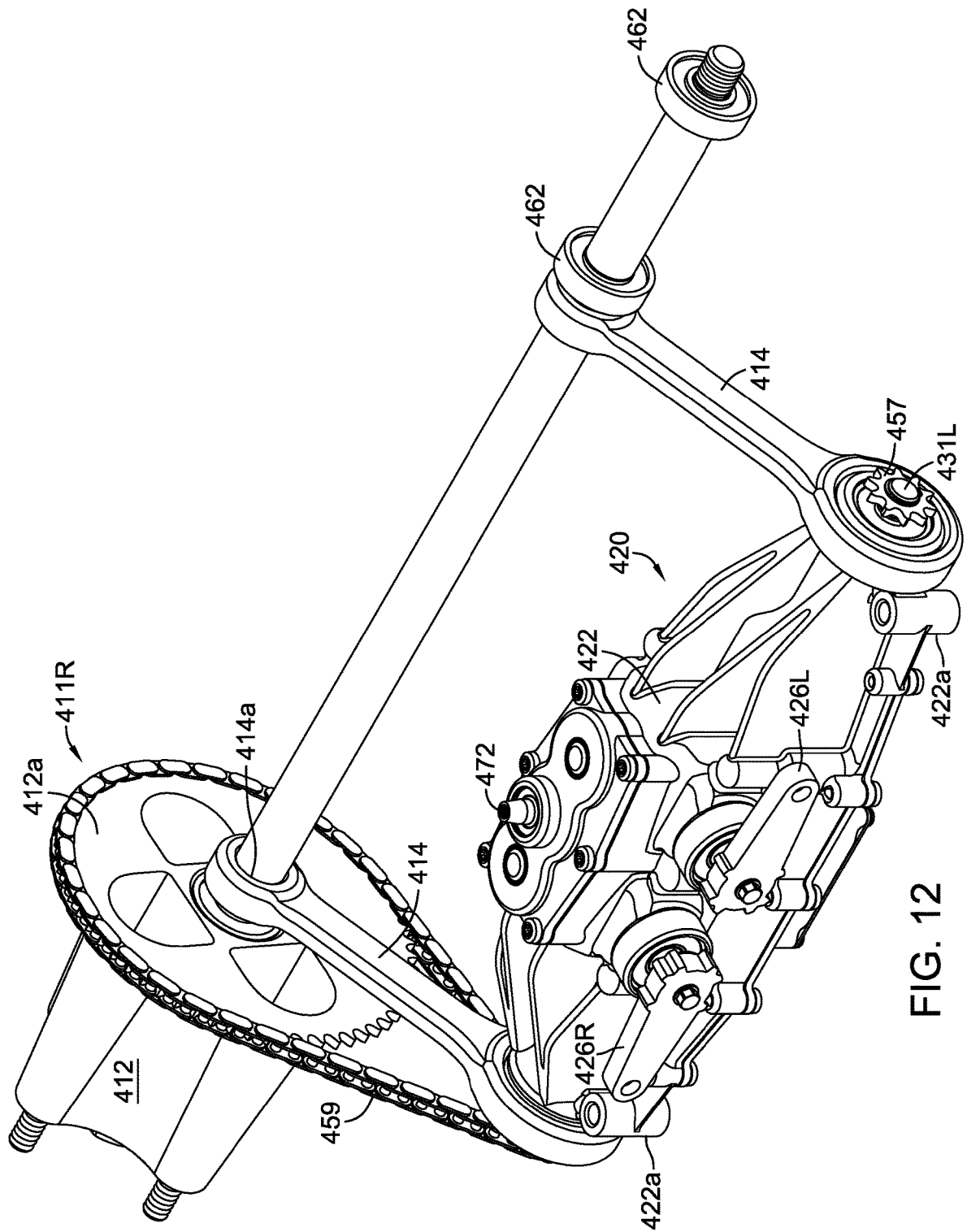
FIG. 12 is a front perspective view of the drive apparatus of FIG. 11, with certain components removed for clarity.
Figure 13:
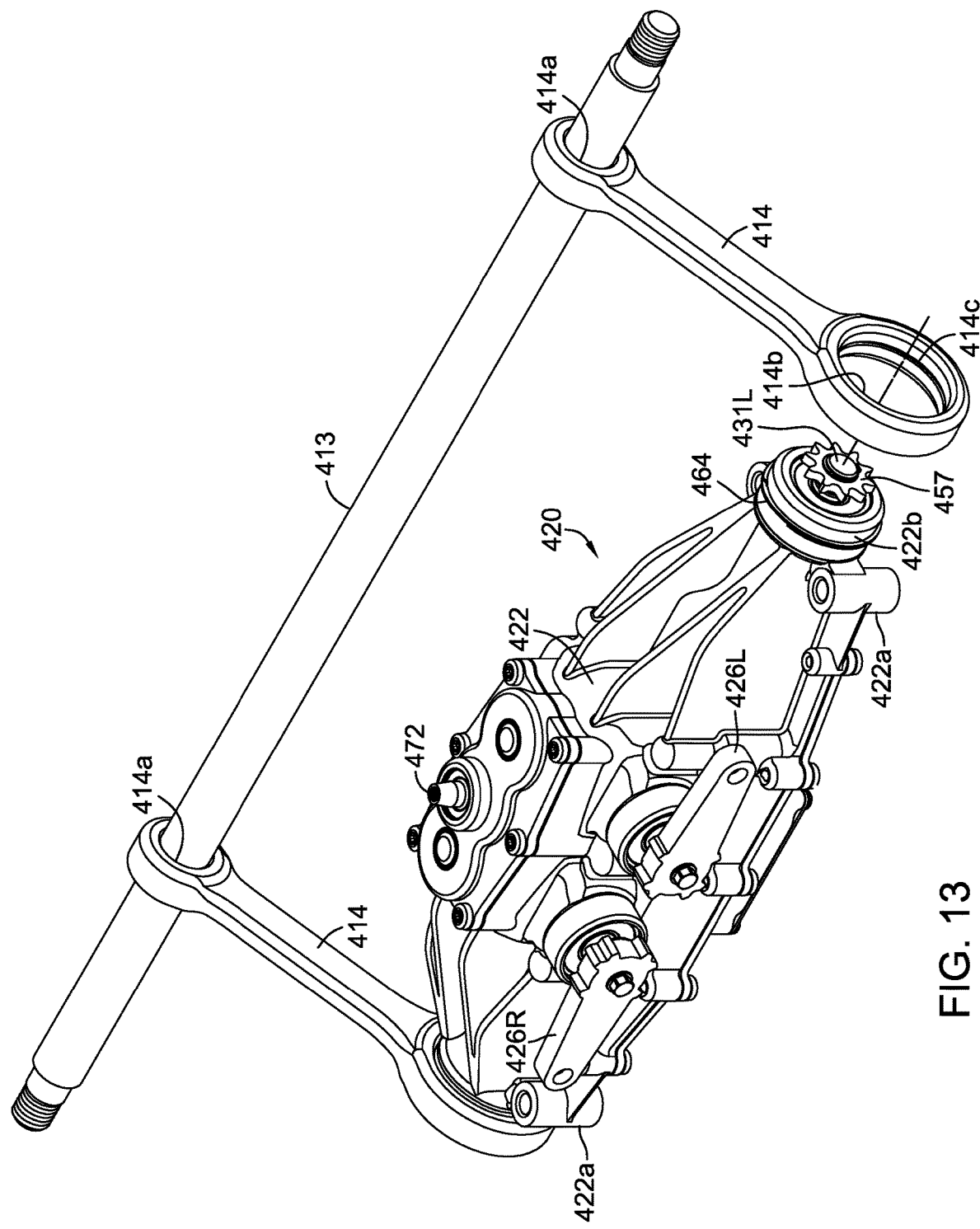
FIG. 13 is a partially exploded, front perspective view of the drive apparatus of FIGS. 11 and 12, with additional components removed for clarity.

A further embodiment of a drive apparatus 410 is depicted in FIGS. 11-13. As before, drive apparatus 410 could be used in a vehicle such as vehicle 300 previously described with minor modifications. As before, similar structure using similar reference numerals but with a different prefix can be substantially the same as previously described except as noted herein. Other than the support structures 422b and provisions for attachment of the final reduction assemblies 411L, 411R as described below, hydrostatic transmission assembly 420 is configured to be substantially identical to hydrostatic transmission assembly 320 described previously herein, and will not be described in further detail. In this embodiment, hydrostatic transmission assembly 420 comprising a transmission main housing 422 has two separate final reduction assemblies 411L, 411R mounted on opposite sides thereof and connected by means of a hub support shaft 413, which does not rotate with respect to a vehicle frame such as frame 301 once it is installed in a vehicle, such as vehicle 300, and has a platform, such as a modified platform 308, secured thereto. Hub support shaft 413 could alternatively be a non-rotatable frame shaft. Each final reduction assembly 411L, 411R comprises a gear hub 412 having a gear flange 412a. Each gear hub 412 is rotatably mounted on the hub support shaft 413 using at least one bearing 462 (two bearings per hub shown) and drives an output wheel such as driven wheel 306. A reduction chain 459 connects each output pinion gear 457 with a gear flange 412a in order to drive gear hubs 412. Each output pinion gear 457 is mounted on and driven by one of motor output shaft 431L on one side or motor output shaft 431R (not shown) on the opposite side. As in prior embodiments, control arms 426L and 426R are disposed external to transmission main housing 422, and input shaft 472 extends outwardly therefrom. Mounting bosses 422a are also provided to connect drive apparatus 410 to a vehicle frame such as frame 301 of vehicle 300.

In this embodiment, final reduction assemblies 411L, 411R are pivotably connected to transmission main housing 422 by means of a pair of pivot arms 414. In FIG. 12, one of the gear hubs 412 and reduction chain 459 are removed so that one can more clearly see one of the pivot arms 414. And, as shown more clearly in FIG. 13, each pivot arm 414 includes a first pivot opening 414a at a distal end acting as an interface to receive hub support shaft 413 such that pivot arm 414 can pivot thereabout during vehicle height adjustment (i.e. ground clearance or mowing height adjustment). At its proximal end, each pivot arm 414 also comprises a second pivot opening 414b acting as an interface to pivotably connect the pivot arm 414 to support structure 422b formed on transmission main housing 422. A groove 414c formed in each pivot arm opening 414b engages a retaining ring 464 formed in support structure 422b to ensure proper connection of the final reduction assemblies 411L, 411R to the hydrostatic transmission assembly 420.

A simple modification of the stand-on platform 308 shown in FIG. 14 will accommodate attachment of platform 308 to the hub support shaft 413 of drive apparatus 410. Similar to the previously described embodiment, a pair of adjustable and locking connection mechanisms 390 (represented by the pair of heavy dashed lines in FIG. 14) is provided to both facilitate a vehicle ground clearance adjustment to vehicle 300 and to secure the stand-on platform 308 in a level, fixed position relative to vehicle frame 301 once the ground clearance adjustment has been made. It should be noted that the ground height of the hub support shaft 413 does not change, and the modified platform 308 secured to support shaft 413 does not necessarily change, when a vehicle ground clearance adjustment is made. However, a different or additional modification to stand-on platform 308 (and possibly to connection mechanisms 390) could be made to accommodate height adjustment of platform 308, if desired for a particular vehicle configuration.

In this embodiment, a drive apparatus for use in a stand-on vehicle having a first driven wheel and a second driven wheel may comprise a transmission assembly comprising a transmission housing with a transmission disposed therein; a first output shaft extending out a first end of the transmission housing and driving a first output gear and a second output shaft extending out a second end of the transmission housing, opposite the first end, and driving a second output gear; a first gear hub comprising a first gear flange and a second gear hub comprising a second gear flange. Such a drive apparatus may further comprise a first reduction chain extending between the first output gear and the first gear flange and transmitting a first output from the transmission to the first gear hub; a second reduction chain extending between the second output gear and the second gear flange and transmitting a second output from the transmission to the second gear hub; an operationally non-rotating hub support shaft extending between the first gear hub and the second gear hub, wherein the first gear hub is rotatably mounted on one end of the hub support shaft and the second gear hub is rotatably mounted on the other end of the hub support shaft. Such a drive apparatus may further comprise a first support structure located on the first end of the transmission housing adjacent the first output gear and a second support structure located on the second end of the transmission housing adjacent the second output gear; a first pivot arm having a first proximal end pivotably mounted on the first support structure and a first distal end pivotably engaged to the hub support shaft; and a second pivot arm having a second proximal end pivotably mounted on the second support structure and a second distal end pivotably engaged to the hub support shaft. Such a drive apparatus may further comprise the first gear flange having a first external face to which the first gear hub is connected, and a first internal face opposite to the first external face, and the second gear flange having a second external face to which the second gear hub is connected, and a second internal face opposite to the second external face, and wherein the first pivot arm is pivotably connected to the hub support shaft adjacent to the first internal face and the second pivot arm is pivotably connected to the hub support shaft adjacent to the second internal face.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive apparatus for a vehicle, the drive apparatus comprising:
   a transmission housing having a transmission disposed therein;
   a first output shaft extending out a first end of the transmission housing and driving a first output gear and a second output shaft extending out a second end of the transmission housing, opposite the first end, and driving a second output gear;
   a first gear hub comprising a first gear flange and a second gear hub comprising a second gear flange;
   a first reduction chain extending between the first output gear and the first gear flange and transmitting a first output from the transmission to the first gear hub;
   a second reduction chain extending between the second output gear and the second gear flange and transmitting a second output from the transmission to the second gear hub;
   a hub support shaft extending between the first gear hub and the second gear hub, wherein the first gear hub is rotatably mounted on one end of the hub support shaft and the second gear hub is rotatably mounted on another end of the hub support shaft and wherein the hub support shaft is configured to be mounted to the vehicle in a non-rotatable manner;
   a first pivot arm having a first proximal end rotatably mounted on the transmission housing and a first distal end rotatably engaged to the hub support shaft; and
   a second pivot arm having a second proximal end rotatably mounted on the transmission housing and a second distal end rotatably engaged to the hub support shaft.

2. The drive apparatus of claim 1, wherein the first gear flange has a first external face to which the first gear hub is connected, and a first internal face opposite to the first external face, and the second gear flange has a second external face to which the second gear hub is connected, and a second internal face opposite to the second external face, and wherein the first pivot arm is rotatably connected to the hub support shaft adjacent to the first internal face and the second pivot arm is rotatably connected to the hub support shaft adjacent to the second internal face.

3. The drive apparatus of claim 1, further comprising a first support structure located on the first end of the transmission housing adjacent the first output gear and a second support structure located on the second end of the transmission housing adjacent the second output gear, wherein the first proximal end of the first pivot arm is rotatably mounted on the first support structure and the second proximal end of the second pivot arm is rotatably mounted on the second support structure.

4. The drive apparatus of claim 3, wherein
   the first proximal end of the first pivot arm comprises a first pivot opening having a first internal surface configured to rotatably engage the first support structure and a first groove formed on the first internal surface configured to engage a first retaining ring disposed on the first support structure; and
   the second proximal end of the second pivot arm comprises a second pivot opening having a second internal surface configured to rotatably engage the second support structure and a second groove formed on the second internal surface configured to engage a second retaining ring disposed on the second support structure.

5. A drive apparatus for a vehicle, the drive apparatus comprising:
   a transmission comprising a first output shaft driving a first output gear and a second output shaft driving a second output gear;
   a first gear hub and a second gear hub;
   a first reduction chain extending between the first output gear and the first gear hub, the first reduction chain transmitting a first output from the transmission to the first gear hub;
   a second reduction chain extending between the second output gear and the second gear hub, the second reduction chain transmitting a second output from the transmission to the second gear hub;
   a hub support shaft extending between the first gear hub and the second gear hub, wherein the first gear hub is rotatably mounted on one end of the hub support shaft and the second gear hub is rotatably mounted on another end of the hub support shaft and wherein the hub support shaft is configured to be mounted to the vehicle in a non-rotatable manner;
   a first support structure located on a first end of the transmission adjacent the first output gear and a second support structure located on a second end of the transmission adjacent the second output gear;
   a first pivot arm having a first proximal end rotatably mounted on the first support structure and a first distal end rotatably engaged to the hub support shaft; and
   a second pivot arm having a second proximal end rotatably mounted on the second support structure and a second distal end rotatably engaged to the hub support shaft.

6. The drive apparatus of claim 5, wherein the first gear hub comprises a first gear flange and the second gear hub comprises a second gear flange and the first reduction chain engages the first gear flange to transmit the first output from the transmission to the first gear hub; and the second reduction chain engages the second gear flange to transmit the second output from the transmission to the second gear hub.

7. The drive apparatus of claim 6, wherein the first pivot arm includes a first pivot opening at the first distal end to receive the hub support shaft, and the second pivot arm includes a second pivot opening at the second distal end to receive the hub support shaft, whereby the first pivot arm and the second pivot arm can each rotate about the hub support shaft.

8. The drive apparatus of claim 6, wherein the first gear flange has a first external face to which the first gear hub is connected, and a first internal face opposite to the first external face, and the second gear flange has a second external face to which the second gear hub is connected, and a second internal face opposite to the second external face, and wherein the first pivot arm is rotatably connected to the hub support shaft adjacent to the first internal face and the second pivot arm is rotatably connected to the hub support shaft adjacent to the second internal face.

9. The drive apparatus of claim 5, wherein:
   the first proximal end of the first pivot arm comprises a first pivot opening having a first internal surface configured to rotatably engage the first support structure and a first groove formed on the first internal surface configured to engage a first retaining ring disposed on the first support structure; and the second proximal end of the second pivot arm comprises a second pivot opening having a second internal surface configured to rotatably engage the second support structure and a second groove formed on the second internal surface configured to engage a second retaining ring disposed on the second support structure.

10. The drive apparatus of claim 5, wherein the transmission is a hydrostatic transmission comprising a hydraulic pump and a hydraulic motor.

11. The drive apparatus of claim 5, wherein the transmission is a hydrostatic transmission comprising a transmission housing, a pair of hydraulic pumps and a pair of hydraulic motors, wherein the pair of hydraulic pumps and the pair of hydraulic motors are disposed on a common center section disposed in the transmission housing.

\* \* \* \* \*